United States Patent [19]
Kuster

[11] 3,790,809
[45] Feb. 5, 1974

[54] MOS MEMORY POWER SUPPLY

[75] Inventor: Karl H. Kuster, Glendale Hgts., Ill.

[73] Assignee: GTE Automatic Electric Laboratories Incorporated, Northlake, Ill.

[22] Filed: Sept. 25, 1972

[21] Appl. No.: 292,023

[52] U.S. Cl................................. 307/41, 317/16
[51] Int. Cl............................................. H02h 3/00
[58] Field of Search...... 307/11, 38, 86, 41; 317/22, 317/16

[56] References Cited
UNITED STATES PATENTS

| 3,261,980 | 7/1966 | McCartney et al. | 307/86 |
| 3,484,618 | 12/1969 | Beezley | 307/41 |
| 2,925,548 | 2/1960 | Scherer | 317/16 |

*Primary Examiner*—Robert K. Schaefer
*Assistant Examiner*—M. Ginsburg
*Attorney, Agent, or Firm*—R. F. Van Epps

[57] ABSTRACT

An MOS memory power supply system including voltage monitoring and sequencing circuits to properly control voltage levels during turn-on, turn-off and fault detection. A first voltage monitoring circuit for measuring the 16 volt output of a regulated power supply, a second voltage monitoring circuit for measuring the 20 volt output of a regulated power supply, the monitor circuits including means for detecting a deviation of the respective output voltage levels from a predetermined range and providing a fault signal, a ramp signal generator providing a signal starting from approximately zero and continuously increasing in level whenever a fault is detected, respective crowbar circuits for the 16 volt and 20 volt output terminals, the 16 volt and 20 volt crowbar circuits including respective means for shorting the output levels at different ramp signal levels, the 16 volt output shorted prior to shorting of the 20 volt output level. An inhibit circuit is also provided for responding to a fault signal from the 20 volt monitor circuit and inhibiting the formation of the 16 volt output level thus insuring that the 20 volt output is always greater than the 16 volt output.

3 Claims, 3 Drawing Figures

PATENTED FEB 5 1974

MOS MEMORY POWER SUPPLY

This invention relates to control devices for power supplies, and in particular to voltage monitoring and sequencing control apparatus for plural output power supplies.

Reference may be made to the following prior U.S. Pat. Nos. : 3,566,147; 3,229,164; 3,261,980; 3,417,259; 3,484,618; 3,432,678; 3,667,001; 3,205,368.

In plural output power supplies there is always the possibility of damage to connected equipment during turn-on or turn-off conditions when transients may be developed, and during a fault when one or more supply voltage levels may exceed their prescribed limits and thereby change relative polarities. This problem is particularly acute when a plural output power supply is to be used with various types of semiconductors, such as contained in MOS memories. In such set-ups, temporary p-n junction voltage reversals during normal turn-on, and turn-off transient conditions and during possible system malfunctions must be avoided in order to avoid costly damage to the memory equipment. Normally, such MOS memory units require two low voltage levels of opposite polarity (as plus and minus 5 volts), and two relatively higher voltage levels (as plus 16 and 20 volts). It is required that a protection circuit be provided to insure the p-n junctions in the MOS memory against voltage reversals.

SUMMARY OF THE INVENTION

A control apparatus is provided for a plural output MOS memory power supply, the control apparatus including voltage monitoring and sequencing circuits to properly control the voltage levels during turn-on, turn-off and fault detection. The voltage monitoring circuits very precisely measure the plural voltage output levels from the power supply and in the event of a detected diversion of the output voltage from the allowable limits for any of the provided outputs, sequencing circuits are initiated to start the turn-off sequence for the power supply. One output voltage level is connected to ground a short time before the second output voltage level, the predetermined time delay between shorting of the two sources being provided by an internally generated ramp signal. The shutdown sequence can be initiated either in response to a manual command as during normal turn-off procedure or to a fault or alarm condition such as when one of the output voltage levels deviates from the acceptable limits on any one of the provided output voltage levels.

DETAILED DESCRIPTION

Figure 1:
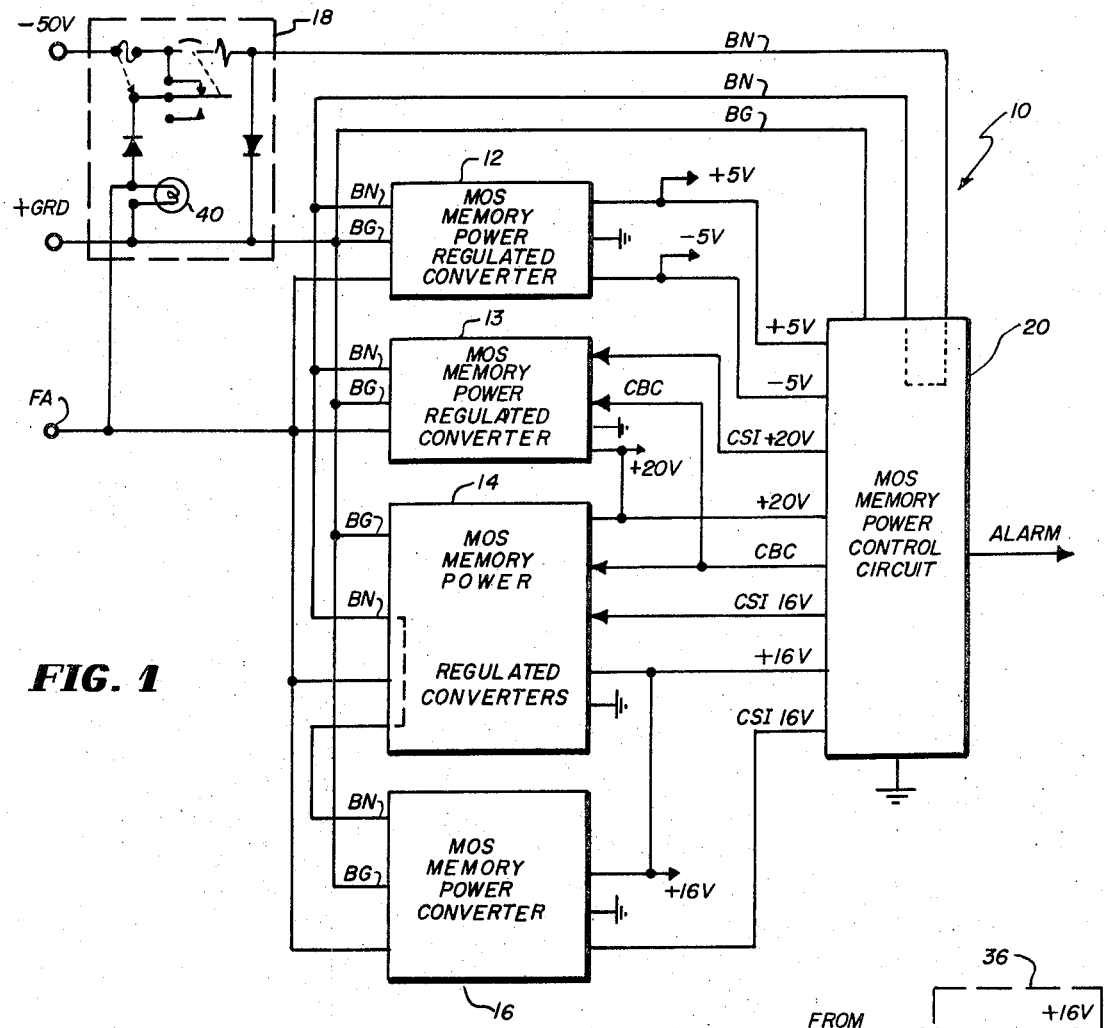
FIG. 1 illustrates in block diagram form the interconnection of an MOS memory power supply including a control circuit constructed in accordance with the principles of the present invention.

Referring now to FIG. 1, there is illustrated in block diagram form MOS memory power control system 10 which includes a plurality of MOS memory power sources including regulated converters 12, 13, 14, and 16. An input fuse and circuit breaker configuration 18 is used to supply the initial power source to the converters, with the converters providing multiple output voltage levels as shown in the diagram. In particular, plus and minus 5 volts are provided by regulated converter 12; plus 20 volts is provided by regulated converter 13; and plus 16 volts is provided by regulated converters 14 and 16. It is understood that these voltage levels are normally supplied for MOS memory units and for purposes of illustrating a control of such voltage levels, the invention herein is described in connection with a minus 50 volt supply normally provided at telephone exchange offices.

The regulated converters 12, 13, 14 and 16 are of the commercially available types capable of having their output terminals shorted or crowbarred without blowing of the converter fuses, as described for instance in U.S. Pat. Nos. 3,400,319, 3,515,974 and 3,736,491 all assigned to the same assignee here.

FIG. 1 illustrates the interconnections between the regulated converters 12, 13, 14 and 16 and a power control circuit 20. The power control circuit 20 is required in an MOS memory power supply for the following purposes:

1. When source power is supplied to or removed from the multiple output power supply, the output voltage level must turn-on and turn-off in specific sequences. This is required in order to prevent damage to the memory devices and also to prevent the erroneous writing or erasing of bits in the memory.

2. If any output voltage level rises or falls outside of the predetermined voltage limitations, a turn-off sequence must be initiated in the power supply.

3. The turn-on sequence must be dependant upon the integrity of the various output voltage levels. For example, if one voltage level is out of tolerance, the turn-on sequence must not continue past that sequence step where the fault occurred.

The interconnections between the power control circuit 20 and the multiple power converters 12, 13, 14 and 16 are illustrated and labeled as shown in FIG. 1. In particular, the main minus 50 volt supply line BN is illustrated as being looped through the power control circuit 20 and extending to each of the converters, 12, 13, 14 and 16. Similarly, the ground side of the minus 50 volt supply is labeled BG and is connected both to the power control circuit 20 and to each of the converters. As illustrated, the regulated converters 12 and 13 provide plus and minus 5 volt output voltage levels and a plus 20 volt output voltage level. Similarly, the regulated converters 14 and 16 provide a plus 16 volt output level. The control connections between the MOS memory power control circuit 20 and the converters 12, 13, 14 and 16 are provided by control leads labeled CSI 20 v; CSI 16 v; and CBC. As will be described in more detail hereinafter, the CSI leads connect inhibit signals from the control circuit to the 16 and 20 volt power converters so as to prevent the formation of an output voltage. The CBC lead is connected to respective crowbar (short to ground) circuits at the output voltage terminals for the 20 volt and 16 volt supplies. Control circuit 20 provides an internally generated ramp signal for insuring that the 20 volt output level is crowbarred a short time after the 16 volt output is crowbarred. The plus 5 and minus 5 voltage levels are not crowbarred, but simply decay.

Figure 2:
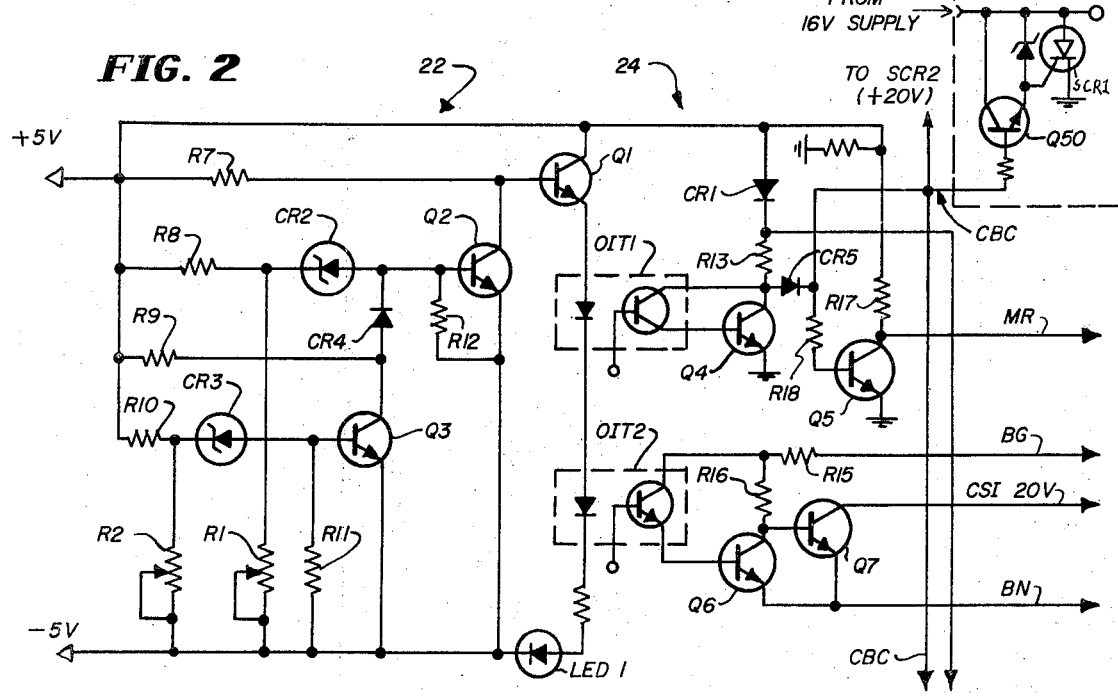
FIG. 2 is a schematic illustration of a portion of the power control circuit.
Figure 3:
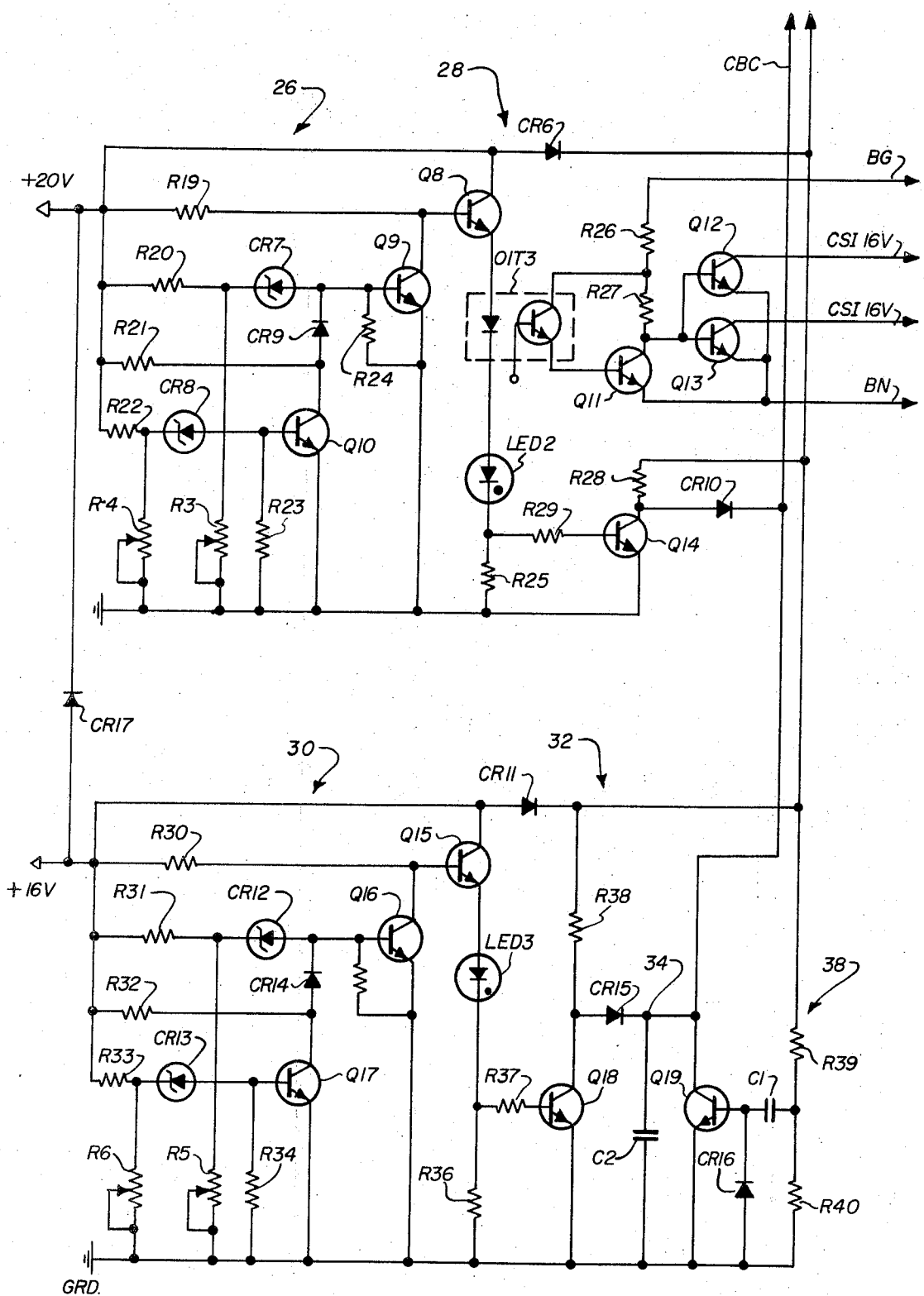
FIG. 3 is a schematic diagram illustrating the remainder of the power control circuit shown in FIG. 2.

Reference may be made to FIGS. 2 and 3 which illustrate a schematic diagram of the power control circuit 20 and the operative connections with the converters 12, 13, 14 and 16. FIG. 2 includes a voltage monitoring circuit 22 for the plus and minus 5 volt output levels and a sequencing circuit 24. Similarly, the upper portion of FIG. 3 includes a voltage monitoring circuit 26 for the plus 20 volts output level and a sequencing circuit 28, the bottom portion of FIG. 3 including a voltage monitoring circuit 30 for the plus 16 voltage level and a sequencing circuit 32.

The voltage monitor circuit 22, 26, and 30 are substantially the same for each of the illustrated output voltage levels. Therefore, their description and operation will be given herein in connection with the 20 volt output level. When zero voltage is applied between the plus 20 volt lead and the ground lead as shown in FIG. 3, the output transistors Q11 and Q14 are non-conducting. When the voltage applied between the plus 20 volt lead and ground is slowly increased in amplitude (starting from zero volts) the output transistors Q11 and Q14 cannot conduct current until the applied voltage reaches an amplitude of about 19.00 volts which is the lower 5 percent limit for the 20 volt supply. Before the applied voltage reaches 19.00 volts, resistor R21 provides a base current for Q9 and transistors Q11 and Q14 cannot conduct as long as Q9 is conducting. When the applied voltage becomes larger than 19.00 volts, regulator diode CR8 provides base current for Q10, which in turn starves the base current for Q9, thereby allowing Q11 and Q14 to conduct. If the applied voltage becomes larger than 21.00 volts, which is the upper 5 percent limit, regulator diode CR7 provides renewed base current for Q9 which then conducts and shuts off Q11 and Q14. The light emitting diode LED2 provides an indication when the 20 volt output level is within the allowable plus or minus 5 percent limits. The optical insulating transistor OIT3 isolates the raw battery supply voltage from the tightly regulated plug 20 output voltage level. As indicated, the voltage monitor circuit 22 for the plus and minus 5 volt levels and the monitor circuit 30 for the plus 16 volt level is similar to the monitor circuit 26 and their respective operations can be understood from the above description of voltage monitoring circuit 26.

The sequencing circuit 28 in FIG. 3 includes transistors Q12 and Q13 for providing an inhibit signal on the CSI 16v leads when the voltage difference between the plus 20 volt lead and the ground lead is outside of the described limits. If the voltage monitor 26 detects a voltage difference between the plus 20 volt lead and the ground lead which is within the prescribed limits, indicating there is no fault, transistors Q12 and Q13 are non-conducting so as to disable the inhibit signal. As shown in FIG. 1, the CSI 16v leads are connected back to the respective 16 volt power converters so as to either enable or disable the 16 volt power supply. That is, an inhibit signal on these leads prevents formation of the 16 volt output. Various means can be utilized to detect the presence or absence of an inhibit signal on the CSI 16 volt leads and disable the corresponding 16 volt supply. As an example, when an inhibit signal is present, the 16 volt power converters can be stopped from oscillating thus preventing any power conversion.

Referring to FIG. 2, in the sequencing circuit 24 there is provided a transistor Q7 which is normally non-conducting when the voltage monitor 22 is detecting a voltage difference between the plus 5 volt lead and the minus 5 volt lead which is between the prescribed limits. If the voltage monitor circuit 22 detects a fault, transistor Q6 is driven off, driving on Q7 and providing an inhibit signal on the CSI 20 volt lead to prevent the formation of the normal 20 volt output level.

The sequencing circuits 24, 28, and 32 include respective transistors Q4, Q14, and Q18 for providing a suitable ramp signal on the CBC lead to insure that sequentially first the 16 volt output voltage level and then the 20 volt output level is shorted to ground in the event a fault is detected by one of the voltage monitoring circuits. Thus, if a fault is detected by voltage monitoring circuit 22, transistor Q4 is turned off enabling diode CR5 to be forward biased and begin charging capacitor C2 through resistor R13. If instead, a fault has been detected by monitoring circuit 26, transistor Q14 is turned off enabling C2 to begin charging through resistor R28. If there is a fault in the 16 volt supply as detected by monitor 30, Q18 is driven off to enable C2 to charge with resistor R38 in series. In either event, terminal 34 of capacitor C2 which is connected to the CBC lead begins to rise from approximately zero volts.

Crowbarring or shorting to ground of the 16 volt output voltage level and the 20 volt level is provided in sequence by the ramp signal on lead CBC. In FIG. 2 there is illustrated a crowbar circuit 36 which includes transistor Q50 having its emitter connected to a silicon controlled rectifier SCR1—SCR1 being interconnected between the 16 volt output terminal and ground. The crowbar circuit 36 is constructed so as to fire SCR1 when the ramp signal on CBC is at least 0.65 volts and no greater than 4.4 volts. A similar crowbar circuit is provided for the plus 20 volt output level with the exception that the 20 volt crowbar circuit is set to fire and connect the 20 volt level to ground whenever the ramp signal is at least 6.5 volts and no greater than 10 volts. Thus, if there is a fault detected by one of the voltage monitoring circuits, the ramp signal on the CBC lead fires SCR1 when the ramp is between 0.65 and 4.4 volts and then sequentially fires SCR2 as the ramp level continues and reaches between 6.5 and 10 volts. As an example, crowbarring of the plus 20 voltage level should be approximately one-half milliseconds after the plus 16 voltage level is crowbarred. The plus 20 voltage level must at all times be larger than the plus 16 voltage level in the present MOS memory embodiment.

The ramp signal on the CBC lead is not present during the turn-on sequence, even though the voltage levels are outside their allowable level limits. This function is provided by a time delay circuit 38 as shown in FIG. 3. The time delay circuit 38 squelches any ramp signal on the CBC lead and is composed of transistor Q19, CR16, C1, R39 and R40. When any voltage monitor input signal starts building up, C1 and R39 provides base current for Q19 which prevents any voltage buildup across C2. Once C1 is charged up, all voltage monitor outputs must be within their limits or else a ramp signal will be generated on the CBC lead. The time delay afforded by circuit 38 is approximately 150 milliseconds and therefore if power-up had not finished by the end of this time interval, the control circuit 20 will proceed with the turn-off sequence. It is for this reason that the minus 50 volt main supply is switched on through circuit breaker circuit 18 rather than being brought up slowly from zero to 50 volts.

Whenever a ramp signal is present on the CBC lead, this is an indication that a fault has been detected. As illustrated in FIG. 2, transistor Q5 derives base drive current from the CBC lead whenever a fault has been detected so as to place an indication on the MR lead. This alarm or fault indication can be used as an audible alarm or for record purposes. Another alarm condition is indicated through lead FA and lamp 40 which provide indications when any fuse is blown in circuit 18 or in the converters 12, 13, 14 or 16.

It is to be noted that each of the voltage monitor circuits 22, 26, and 30 includes temperature compensation. For instance, in monitor circuit 26, the temperature coefficient of diode CR8 is opposite to that of the base to emitter junction of transistor Q10, while the temperature coefficient of diode CR7 is opposite to that of the base to emitter junction of transistor Q9, making this voltage monitor temperature insensitive. It can be seen that the same temperature compensating provisions have been provided in monitor circuits 22 and 30.

The various operations of the previously described control circuit for the following conditions will now be described for purposes of illustrating the desired monitoring and sequencing functions to be accomplished in such conditions:

1. Normal turn-on sequencing;
2. A normal turn-off sequence;
3. Detected fault in the minus 5 volt output;
4. Detected fault in the 16 volt output;
5. Detected fault in the 20 volt output.

Normal turn-on sequence. At the time that the minus 50 volt power is switched on through the circuit breaker, all of the converters have minus 50 volts applied to their input but only the plus 5 and minus 5 voltage levels can start building up. Transistor Q7 is in saturation so as to place an inhibit signal on the CSI 20 v lead to prevent the 20 volt supply from turning on. Similarly, transistors Q12 and Q13 are both on placing an inhibit signal on the two CSI 16 v leads to prevent turn-on of the 16 volt power converters. When both the plus 5 and minus 5 power supplies have reached their allowable limits, transistor Q6 is driven on to drive Q7 off and disable or remove the inhibit signal from the CSI 20 v lead to enable the 20 volt supply. As the 20 volt supply starts rising to its allowable limits on voltage output level, the plus 20 voltage monitor 26 upon sensing the 20 volt lower allowable limit drives transistor Q11 on, to drive both transistors Q12 and Q13 off so as to remove the inhibit from the CSI 16 v leads and enable turn-on of the 16 volt supply. The 16 volt supply then rises to its allowable limit and is then monitored by the 16 volt minitor circuit 30. The aforementioned turn-on sequence assures that the plus 20 voltage will always be higher than the plus 16 voltage supply at all times during the turn-on sequence. As previously indicated the ramp signal on CBC is not present during the turn-on sequence due to the squelch circuit 38.

Normal turn-off sequence. As the minus 50 volt power is switched off, all of the converters have minus 50 volts removed from their inputs. All four voltage levels start decaying, the rate of decay for each depending on their respective loads at the time of power turn-off. For purposes of illustration let us assume that it is the 20 volt power supply which is heavily loaded and therefore decays the fastest. As soon as the 20 volt supply decays below its minimum limit, the voltage monitor circuit 26 responds and shuts off the light emitting diode LED2. Transistor Q14 is then driven off thus enabling a ramp signal to be presented on lead CBC through the charging of capacitor C2 with R28 in series. As soon as the ramp signal on lead CBC reaches 0.65 to 4.4 volts, SCR1 is fired and the 16 volt output terminals are crowbarred (shorted to ground). In conjunction with the crowbarring of the 16 volt output lead, the formation of the 16 volt level is also disabled by reinitiating the inhibit signal on the CSI 16 volt leads. Referring to FIG. 3, as the 20 volt supply decays below the lower limit, the voltage monitoring circuit 26 responds to turn-off optical insulating transistor OIT3 to drive transistor Q11 off and turn on transistors Q12 and Q13 to place the inhibit signal back on the CSI 16 volts leads. As the ramp signal on the CBC lead continues to rise in voltage level to between 6.5 and 10 volts, silicon controlled rectifier SCR2 across the 20 volt supply output terminals is fired to crowbar the 20 volt output terminals. This sequence during turn-off insures that the 16 volt supply output is always less than the 20 volt supply. It may be noted that after crow-barring of the 16 volt level, monitor circuit 30 detects a fault, turning off Q18 and placing R38 in parallel with R28, the combination in series with C2. This increases the slope of the charging voltage of C2 and speeds up the reaching of the crowbar level for the 20 volt terminals.

Malfunctioning in minus 5 volt level. In the event of some fault developing at the minus 5 volt terminals, the voltage monitor circuit 22 shown in FIG. 2 detects the fault and turns off LED1 to give a visual indication. In addition, transistor Q4 is turned off to initiate a ramp signal on the CBC lead. The ramp signal is formed by the charging of capacitor C2 through R13. As soon as SCR1 reaches its firing voltage, it fires and crowbars the 16 volt output to ground. In the meantime, when the minus 5 volt supply goes off limits, transistor Q6 is turned off thereby turning on Q7 and placing an inhibit signal on the CSI 20 volt lead to disable formation of the 20 volt level. As the 20 volt supply voltage drops below its limits, the 20 volt monitor circuit 26 detects the drop and turns on transistors Q12 and Q13 to place the inhibit signal on the CSI 16 volt leads so as to disable formation of the 16 volt levels. This procedure also insures that the 16 volt output will always be less than the 20 volt output during this shut down sequence. It may also be observed that after crowbarring of the 16 volt output leads, as the 16 volt supply drops below its limit, the 16 volt monitor detects this difference and turns off transistor Q18 so as to place R38 in parallel with R13 and into the series charging line of capacitor C2 so as to provide a steeper slope in the ramp signal, thereby arriving at the crowbarring level for the 20 volt supply in a shorter time.

Malfunctioning in 16 volt level. Here we may assume for instance that the 16 volt supply is so heavily loaded that the output level is at 14 volts—that is, below the plus or minus 5 percent limit. This situation is the easiest to protect since as soon as the output at the 16 volt terminals drops below the set limits, voltage monitor circuit 30 detects the fault. This shuts off LED3 and turns off transistor Q18 thus providing a ramp signal on the CBC lead through the charging of capacitor C2 via CR15 and R38. When the firing voltage for SCR1 is reached, the 16 volt output is clamped to ground. After a short time delay provided by the ramp signal due to the charging of capacitor C2, and when the firing voltage of SCR2 is reached, then the 20 volt output is crowbarred. Upon decay of the 20 volt output, voltage monitoring circuit 26 detects the drop and turns off Q12 and Q13 to place the inhibit signal back on to the CSI 16 volt leads.

Malfunction in plus 20 volt level. Proper sequencing shut down is necessary in this instance so as to prevent the output level at the 20 volt terminals from ever becoming less than the 16 volt levels. This is provided by the following shut down sequence. Detection of a drop in the 20 volt level is provided by the voltage monitoring circuit 26 which then turns on Q12 and Q13 to disable formation of the 16 volt level by placing an inhibit signal on the CSI 16 volt leads. In addition, Q14 is turned off to place the ramp signal on the CBC lead by the charging of capacitor C2 through R28. This almost immediately clamps the 16 volt output terminals to ground through SCR1. After a time delay provided by the higher firing voltage of SCR2, the ramp signal reaches the SCR2 firing level, and the 20 volt output level is crowbarred.

In the event the plus 16 volt supply should be higher than the plus 20 volt supply (a malfunctioning control circuit 20), Schottky diode CR17 (FIG. 3) provides protection for the p-n junctions in the MOS memory by limiting this relative voltage reversal to a safe 0.5 volts or less value.

It is to be understood that various alternative embodiments can be provided in accordance with this invention. If for instance a negative 20 and 16 volt levels are to be supplied, the ground and respective 20 and 16 volt connections shown in FIG. 3 can be interchanged and the CBC part of the sequencing circuits inverted. Also, to avoid any possible overloading of sequencing circuit 28 or to provide isolation between the two 16 volt converters, instead of the separate transistors Q12 and Q13, one can be eliminated and replaced by a duplicate OIT3, Q11 and Q13 type circuit connected to the emitter of Q8.

If more or less power is to be supplied for any voltage level, converters can be added or removed as with the 16 volt power supply shown in FIG. 1, where converter 16 can be removed for less 16 volt power needs.

What is claimed is:

1. In an MOS memory power supply system having a first power source providing a first output voltage level at its output terminals; a second power source providing a second output voltage level at its output terminals, said first voltage level being less than said second voltage level, said power sources including means for preventing damage to said power sources during shorting of said output terminals, the improvement comprising;

a first voltage monitor circuit coupled to said first output terminals for measuring said first output voltage level, including means for detecting a deviation of said first output voltage level from a predetermined range and providing a fault signal;

a second voltage monitor circuit coupled to said second output terminals for measuring said second output voltage level, including means for detecting a deviation of said second output voltage level from a predetermined range and providing a fault signal;

a ramp signal generator means responsive to said fault signals from said voltage monitor circuits for generating a ramp signal having increasing voltage levels;

a first crowbar circuit means coupled to said first output terminals for shorting said terminals;

said first crowbar circuit means including a first preset firing voltage level device for shorting said first output terminals;

a second crowbar circuit means coupled to said second output terminals for shorting said terminals;

said second crowbar circuit means including a second preset firing voltage level device for shorting said second output terminals;

said first and second crowbar circuit means each including sequential firing means responsive to said ramp signal having increasing voltage levels for firing said first preset firing voltage level device and crowbarring said first output terminals prior to firing said second preset firing voltage level device and crowbarring said second output terminals; and inhibit circuit means coupled to said first power source and responsive to one of said fault signals for inhibiting the formation of said first output voltage level.

2. The improvement of claim 1, wherein said ramp signal generator means comprises:

a first generator means responsive to a fault signal from said first voltage monitor circuit for providing a first ramp signal having a continuously increasing slope; and a second generator means responsive to a fault signal from said second voltage monitor circuit for providing a second ramp signal having a continuously increasing slope.

3. The improvement of claim 2, including means for coupling said first and second ramp signals to provide a composite ramp signal having a composite continuously increasing slope steeper than either of said first or second slopes.

* * * * *